United States Patent Office 3,518,116
Patented June 30, 1970

3,518,116
COMPOSITIONS AND METHODS FOR PRODUCING ELECTRICALLY CONDUCTIVE COATINGS
Arthur J. Stock, Port Huron, Mich., and Frank M. Hunter, deceased, late of Port Huron, Mich., by Margaret C. Hunter, administratrix, Port Huron, Mich., assignors to Acheson Industries, Inc., Port Huron, Mich., a corporation of Michigan
No Drawing. Continuation-in-part of application Ser. No. 464,240, June 15, 1965. This application July 10, 1968, Ser. No. 744,620
Int. Cl. H01j 29/00
U.S. Cl. 117—226     12 Claims

ABSTRACT OF THE DISCLOSURE

A composition for use in forming electrically conductive coatings, such as interior surface coatings for cathode ray tubes, which composition is comprised of a conductive pigment, alkali metal silicate, water soluble or dispersible organic resin material, alkali metal carboxylic acid salt, and water; and, the method of forming electrically conductive coatings using said composition.

Cross reference to related application

This application is a continuation-in-part of application Ser. No. 464,240, filed June 15, 1965, now abandoned.

This invention relates to compositions for and the method of producing electrically conductive coatings on supporting surfaces. More particularly, this invention concerns the method of and compositions for the production of coatings on the walls of electron discharge tubes such as cathode ray tubes and more specifically television picture tubes for color or black and white reception.

The use of conductive coatings in electron discharge tubes is well known, but the previously known and commercially used coatings have shortcomings including softness, poor adhesion, deficient electrical conductivity, excessive shrinkage on drying, difficulty in outgassing and continuing loss of gas during operation or the like. These deficiencies are corrected and other desirable features are obtained by formation of coatings from the coating compositions of this invention.

In the heretofore known compositions for producing conductive coatings that were used on the interior surface of cathode ray tubes the presence of organic constituents was considered to be undesirable. In accordance with this invention, however, it has been found that certain organic compounds, as will be detailed later in this specification, provide improved adherence, hardness and performance characteristics in the resulting coatings on the interior of cathode ray tubes.

A primary object of this invention is to provide a composition which can be applied to a surface to form an electrically conductive coating having improved adhesion, improved hardness, and improved resistance to shrinkage and abrasion.

A further object of this invention is to provide a composition useful for forming an electrically conductive coating on the interior surfaces of electron discharge tubes, especially those known as cathode ray tubes, which has improved adhesion, improved hardness, improved resistance to abrasion, improved outgassing properties when the tubes are evacuated and a decreased tendency for disintegration of the coating during use.

A further object is to provide cathode ray tubes having on an interior surface thereof electrically conductive coatings having improved hardness, improved resistance to abrasion, improved adhesion and improved outgassing characteristics.

Broadly stated, the compositions of this invention comprise a conductive pigment dispersed in an aqueous system containing an inorganic binder, a water-soluble or dispersible resin component and a thermally decomposable metallo-organic material capable of modifying the curing characteristics of the inorganic binder. Broadly, the inventive composition is for use in forming electrically conductive coatings, and comprises, in weight percent, about 10% to about 25% of a conductive pigment, about 15% to about 80% alkali metal silicate containing between about 42% and about 71% water, about 0.3% to about 5% of a water soluble or dispersible organic resin material, about 0.05% to about 10% of an alkali metal carboxylic acid salt, and the balance water.

The conductive pigment used may be selected from such well known conductive powders as conductive carbon black, graphite, metal particles, etc., or mixtures thereof. The preferred conductive pigment of this invention is graphite. It has been found that both natural and artificial graphites may be effectively used, and that the particle size or shape of the graphite is not critical, except that the graphite is preferably finely divided, for example, finer than 200 mesh.

The inorganic binder constituent is the material commonly known as water glass, namely, aqueous solutions of an alkali metal silicate such as the sodium or potassium silicates or mixtures thereof. Any of the commercially available water glass materials may be satisfactorily employed and these materials vary in water content from approximately 42% to 71%, by weight, and have ratios of alkali metal to silicate expressed as percent alkali metal oxide to $SiO_2$ in the range of 1 to 2 to 1 to 7, and preferably in the range of 1 to 2 to 1 to 3.5.

The organic resin component serves to improve the initial adhesion properties and flow characteristics of the compositions and to maintain the conductive pigment in dispersed condition prior to application to the substrate and during, at least, the initial curing stages of the inorganic binder component. Organic resinous materials for this purpose should be water soluble or water dispersible and decomposable at the temperatures normally employed in cathode ray tube manufacturing leaving a residue which does not generate deleterious gases during subsequent processing and use. Resins possessing these requirements include the water soluble or water dispersible cellulosic resinous materials such as methyl cellulose, sodium carboxymethyl cellulose, hydroxyethyl cellulose, water soluble gums and plant extracts such as agar-agar, Irish moss extract, polyvinylpyrrolidone and polyvinyl alcohols and mixtures thereof. The preferred material for this purpose is polyvinyl pyrrolidone since this resin has been found to possess all of the required characteristics to an unusual degree. Polyvinylpyrrolidone is compatible with the silicate binder and decomposable at normal bake-out temperatures for cathode ray tube manufacture. It aids in forming the initial coating on a glass substrate by its film-forming ability and its ability to wet glass. It also appears to maintain the uniformity of the distribution of the conductive pigment in the binder-carrier system as the aqueous carrier is removed during the normal drying of the coating. The lower molecular weight polyvinylpyrrolidone materials are particularly suitable, for example, materials having a molecular weight in the range of about 8,000 to about 50,000. The compositions herein may also include optionally a dispersing agent to obtain proper rheological properties. Certain compositions of the herein disclosed materials using only the water dispersible organic resin are too thick. Examples of such dispersing agents would be sodium lignin sulfonate or naphthalene sulfonic acid condensates.

Cathode ray tube coatings formed from the heretofore known compositions containing graphite and alkali metal silicates have a smooth, hard, glassy surface which overlies a soft, easily abraded lower layer. It has been found to be extremely difficult, if not impossible, to heat cure the alkali metal silicate to a form that is hard and abrasion resistant throughout its entire depth because the upper glassy surface tends to trap some of the water of hydration during such cure. In accordance with this invention, it has been found that in the presence of the above named ingredients, this problem of the formation of an upper glassy water-impervious layer is eliminated by incorporating into the aqueous compositions a small quantity of an ionizable or disassociatable alkali metal salt of certain carboxylic acids, and for this purpose the expression "alkali metal" salt is intended to include the ammonium salts. These salts modify the alkali metal silicate binder during dehydration to form a porous coating which remains sufficiently porous throughout the curing operation to permit water or gaseous decomposition products of any of the components in the film to escape. This modification of the film enables the complete removal of all of the water of hydration in the inorganic binder and a substantially complete cure of the binder to a hard abrasion-resistant form. Suitable salts, or film modifiers, for this purpose preferably include the sodium or potassium salts of the monocarboxylic, dicarboxylic, the hydroxy dicarboxylic and hydroxytricarboxylic aliphatic and aromatic acids. The simple salts of the aliphatic acids such as sodium acetate or potassium oxalate or the aromatic acids such as potassium phenylacetate or sodium benzoate may be used but better results have been obtained from the use of more complex salts such as potassium acid tartrate or potassium sodium tartrate. The best results to date have been obtained with potassium sodium tartrate. The exact mechanism by which such salts function to improve the adhesion, hardness and abrasion resistance of the resultant coatings is not fully understood but evidence has been obtained which demonstrates that the ions in the aqueous composition which result from their presence, or the same ions from an equivalent source, are necessary in order to avoid the water impervious glassy surface and the easily abraded lower layer, and to provide improved adhesion, hardness and abrasion resistance.

The compositions of this invention may contain the above discussed components in the relative proportions set forth below in Table I.

TABLE I

| Conductive pigment: | Weight percent |
|---|---|
| Graphite, carbon black, finely divided metal, or mixtures | 10–25 |
| Binder (alkali metal silicate—42%–71% water) | 15–80 |
| Organic resinous materials (water soluble or dispersible resin) | 0.3–5.0 |
| Alkali metal salt of carboxylic acid salt | 0.5–10 |
| Water | Balance |

A preferred formulation is set forth in Table II.

TABLE II

| Conductive pigment: | Weight percent |
|---|---|
| Graphite, carbon black, finely divided metal, or mixtures | 12–20 |
| Binder (alkali metal silicate—42%–71% water) | 35–75 |
| Organic resinous materials (water soluble or dispersible resin) | 0.75–2.0 |
| Alkali metal carboxylic acid salt | 1.0–5 |
| Water (distilled or deionized) | Balance |

While the composition percent ranges set forth in Tables I and II above do set forth workable and quite satisfactory compositions in accordance with the invention herein, it has been discovered that the alkali metal carboxylic acid salt may be present in amounts as low as 0.15% by weight while still obtaining satisfactory results in accordance with the invention herein; moreover, on a broad basis it is considered that the carboxylic acid salt may be present in amounts as low as 0.05% by weight.

The compositions of this invention are prepared by simply blending the selected quantity of each of the components and mixing until a uniform dispersion is obtained. No particular order of addition of the components is necessary and any of a variety of standard mixing equipment may be used to form the dispersions.

The method of using this invention broadly comprises the steps of applying a composition of this invention to the substrate to be coated by spraying, brushing, flowing, roller-coating, or the like, to deposit on the substrate the desired quantity of that composition. For cathode ray tube coatings a sufficient quantity of the composition is applied to produce a cured coating thickness in the range of about 0.1 to about 2 mils. Thereafter, the coating may be preliminarily dried with circulating hot air or the like, and then heat cured at a temperature within the range of about 250° C. to 475° C. for about one-half to about two and one-half hours. Alternatively, the preliminary hot air drying step may be omitted and the coated surface slowly raised from room to its final curing temperature. After curing, the coating is optionally water rinsed or may be used in its heat cured condition.

The following examples will illustrate this invention in greater detail.

EXAMPLE I

A coating composition was prepared containing the following materials, in weight percent:

| | Weight percent |
|---|---|
| Graphite (maximum particle size—10 microns) | 14.2 |
| Polyvinylpyrrolidone (average molecular weight—10,000) | 1.5 |
| Aqueous potassium silicate (30° Baumé at 68° F., viscosity—7 centipoises at 68°) 9.05% $K_2O$ and 19.9% $SiO_2$ | 74.1 |
| Deionized water | 10.2 |

The above ingredients were thoroughly mixed for 16 hours in a standard pebble mill. The dispersion removed from the mill was applied to a 3" x 6" glass panel, at room temperature, by spraying. The coated panel was cured in an air atmosphere furnace slowly raised to a temperature of 400° C., with the panel being maintained at 400° C. for approximately one hour.

When the panel was removed from the furnace and inspected under a microscope at magnifications up to 60 diameters the coating was observed to be smooth, glassy and free of pores. The coating was measured for electrical resistance and found to have a resistance of 126 ohms per square. The adhesion and hardness of the film was tested by scraping a blunt metal blade across the coating. The glassy skin of the film was easily pierced and portions of the coating removed in the form of flakes.

EXAMPLE II

A coating composition was prepared, using similar mixing equipment and procedures as those employed in Example I to contain the following ingredients, in weight percent:

| | Weight percent |
|---|---|
| Graphite (maximum particle size—10 microns) | 14 |
| Polyvinylpyrrolidone (average molecular weight—10,000) | 1.5 |
| Aqueous potassium silicate (30° Baumé at 68° F.—7 centipoises viscosity at 68°) 9.05% $K_2O$ and 19.9% $SiO_2$ | 73.1 |
| Potassium sodium tartrate | 1.4 |
| Deionized water | 10 |

A glass panel was coated, by spraying, with the above composition and heat cured under identical conditions to those stated in Example I.

Visual inspection of the panel, without magnification, revealed that the surface was a porous mat-appearing layer. The presence of the pores was confirmed by microscopic examination up to 60 diameters magnification, and they appeared to be distributed over the entire surface of the coating. The film was measured and found to have an average thickness of 0.7 mil and an electrical resistance of 122 ohms per square.

Using the same adhesion measurement test described in Example I, the film was found to be substantially harder and more adherent than the coating of Example I. No penetration or flaking of the coating was obtained in the test.

EXAMPLE III

The following compositions employ other film modifiers, in the composition of Example II and each was used in the amount of 1.4 weight percent for comparative purposes. The characteristics of the resulting coatings on glass substrate surfaces are set forth in tabular form below:

EXAMPLE V

| | Weight percent |
|---|---|
| Graphite (maximum particle size—200 mesh) | 16 |
| Potassium silicate solution (30° Baumé at 68° F., viscosity—7 centipoises at 68°) 9.05% $K_2O$ and 19.9% $SiO_2$ | 73 |
| Potassium bitartrate | 5.0 |
| Polyvinyl alcohol (percent hydrolysis 87–89, pH 6–8, 5% volatiles)—viscosity 35–45, cps. measured in a 4% water solution at 20° C. by the Hoeppler falling ball method. | 1.5 |
| Water | 4.5 |

Other coating compositions resulting from using similar mixing equipment and procedures as those employed in Example I are set forth in Examples VI–IX.

EXAMPLE VI

| | Weight percent |
|---|---|
| Graphite (maximum particle size—10 microns) | 14 |
| Methyl cellulose | 1.5 |
| Aqueous potassium silicate (30° Baumé at 68° F., viscosity—7 centipoises at 68°) 9.05% $K_2O$ and 19.9% $SiO_2$ | 73.1 |
| Potassium sodium tartrate | 1.4 |
| Deionized water | 10 |

EXAMPLE VII

| | Weight percent |
|---|---|
| Graphite (maximum particle size—10 microns) | 14 |
| Sodium carboxymethyl cellulose | 1.5 |
| Aqueous potassium silicate (30° Baumé at 68° F.—7 centipoises viscosity at 68°) 9.05% $K_2O$ and 19.9% $SiO_2$ | 73.1 |
| Potassium sodium tartrate | 1.4 |
| Deionized water | 10 |

EXAMPLE VIII

| | Weight percent |
|---|---|
| Graphite (maximum particle size—10 microns) | 14 |
| Hydroxyethyl cellulose | 1.5 |
| Aqueous potassium silicate (30° Baumé at 68° F.—7 centipoises viscosity at 68°) 9.05% $K_2O$ and 19.9% $SiO_2$ | 73.1 |
| Potassium sodium tartrate | 1.4 |
| Deionized water | 10 |

| Film modifier material | Cured film appearance | Cured film properties | Cured film thickness (mils) | Cured film resistance (ohms per sq.) |
|---|---|---|---|---|
| Potassium succinate | Porous, mat surface. | Hard, adherent. | 1.3 | 56 |
| Potassium oxalate | do | do | 1.2 | 65 |
| Potassium citrate | do | do | 1.1 | 54 |
| Potassium acetate | do | do | 1.3 | 50 |
| Potassium bitartrate | do | do | 0.9 | 38 |
| Sodium acetate | do | do | 1.1 | 55 |
| Sodium oxalate | do | do | 1.3 | 54 |
| Ammonium bitartrate | do | do | 1.1 | 44 |
| Ammonium succinate | do | do | 1.4 | 54 |

The following examples set forth additional suitable compositions:

EXAMPLE IV

| | Weight percent |
|---|---|
| Graphite-micronized, natural (average particle size—5 microns) | 12 |
| Sodium silicate solution 8.9% $Na_2O$: 28.7% $SiO_2$—1:3.22 S.G. 41° Baumé at 68° F. | 70 |
| Sodium acetate | 2.0 |
| Water | 14 |
| Polyvinylpyrrolidone (average molecular weight, 40,000) | 2.0 |

EXAMPLE IX

| | Weight percent |
|---|---|
| Graphite (maximum particle size—10 microns) | 14 |
| Aqueous potassium silicate (29% solids) | 29 |
| Polyvinylpyrrolidone (average molecular weight, 40,000) | 0.2 |
| Rochelle salt (potassium-sodium tartrate) | 0.2 |
| Sodium lignin sulfonate (dispersing agent) | 0.4 |
| Deionized water balance | 56.2 |

What is claimed is:
1. A composition for use in forming electrically conductive coatings which comprise, in weight percent, about

12% to about 20% of a conductive pigment, about 35% to about 75% alkali metal silicate containing between about 42% and about 71% water, about 0.75% to about 2% of a water soluble or dispersible organic resin material, about 0.15% to about 10% of an alkali metal carboxylic acid salt, balance water.

2. A composition in accordance with claim 1 wherein said carboxylic acid salt is potassium sodium tartrate.

3. A composition in accordance with claim 1 wherein said alkali metal silicate is potassium silicate.

4. A composition in accordance with claim 3 wherein said resin is polyvinylpyrrolidone.

5. A composition in accordance with claim 4 wherein said alkali metal carboxylic acid salt is potassium sodium tartrate.

6. A method for forming an electrically conductive coating on a surface of a cathode ray tube which comprises applying to said surface a composition comprising, in weight percent, about 12% to about 20% of a conductive pigment, about 35% to about 75% alkali metal silicate containing between about 42% and about 71% water, about 0.75% to about 2% of a water soluble or dispersible organic resin material, about 0.15% to about 10% of an alkali metal carboxylic acid salt, balance water, heat curing said composition on said surface at a temperature within the range of about 250° C. to about 475° C. until said coating is hard and adherent to said surface.

7. A method in accordance with claim 6 wherein the carboxylic acid metal salt is sodium potassium tartrate.

8. A method in accordance with claim 6 wherein said alkali metal silicate of said composition is potassium silicate.

9. A method in accordance with claim 8 wherein said resin is polyvinylpyrrolidone.

10. A method in accordance with claim 9 wherein said carboxylic acid salt is sodium potassium tartrate.

11. A cathode ray tube having on its interior surface a heat cured, adherent electrically conductive coating formed thereon by using the method of claim 6, said coating having a thickness in the range of 0.1 to about 2 mils.

12. In a cathode ray tube having an interior surface the improvement comprising:
a composition, forming a coating on said interior surface, said composition consisting essentially of, in weight percent, about 10% to about 25% of a conductive pigment, about 15% to about 80% alkali metal silicate containing between about 42% and about 71% water, about 0.3% to about 5% of a water soluble or dispersible organic resin material, about 0.15% to about 10% alkali metal carboxylic acid salt and the balance water.

References Cited
UNITED STATES PATENTS 3,043,784   7/1962   Rearer _____ 252—506 X ALFRED L. LEAVITT, Primary Examiner ALAN GRIMALDI, Assistant Examiner U.S. Cl. X.R.

252—506, 511